J. HIBBS.
Plow-Cleaner.
No. 11,935. Patented Nov. 14, 1854.
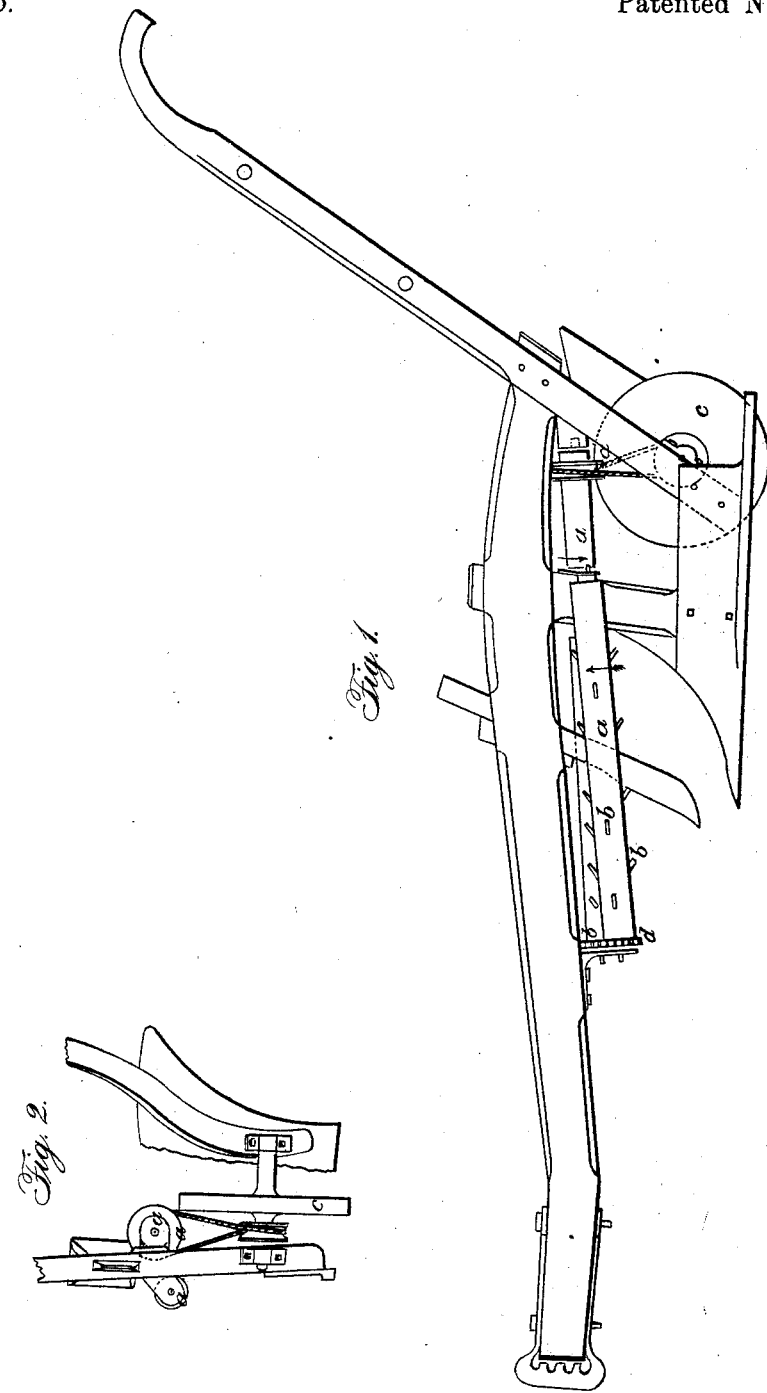

UNITED STATES PATENT OFFICE.

JONATHAN HIBBS, OF TULLYTOWN, PENNSYLVANIA.

IMPROVEMENT IN PLOWS.

Specification forming part of Letters Patent No. 11,935, dated November 14, 1854.

*To all whom it may concern:*

Be it known that I, JONATHAN HIBBS, of Tullytown, county of Bucks, and State of Pennsylvania, have invented certain new and useful Improvements in Plows; and I do hereby declare that the following is a full, clear, and exact description of the same, reference being made to the annexed drawings, making a part of this specification, in which—

Figure I is a side view or elevation. Fig. II is a view of the back end.

Similar letters refer to similar parts throughout.

My improvement consists in the application of a mechanical contrivance put in operation by the onward movement of the plow for the purpose of clearing away weeds, brush, &c., and preventing them from choking and clogging up the fore part of the plow. It also enables the plowman to cover in long stable-manure more perfectly, as will appear from the following description.

My apparatus consists of two rollers armed with teeth or spikes and lying horizontally under the beam of the plow and on each side of the cutter, said rollers being made to revolve while the plow is in motion. As they turn round the spikes take hold of the weeds and strip them downward and carry them clear on either side, thus opening a track for the plow to enter, and whereby, also, it is prevented from being choked up.

At *a* are the rollers, suspended beneath and on either side of the plow-beam, as shown in Fig. 1. These are armed with pegs or spikes, the spikes being driven in so as to incline toward the back of the plow, as shown at *b*, and this prevents the weeds from adhering to the rollers, since they will readily slip off as the plow moves onward. The rollers are made to revolve by means of a wheel placed in the back part of the fork formed by the spread of the share and landside, as shown at *c*, the wheel being so hung that the rim shall always press upon the ground with sufficient force to insure its turning round.

On the axis of the wheel there is a pulley, from which a belt passes over another pulley upon the end of the inside roller, as at *a'*, and thus gives motion to that. The other or outside roller is driven by a cog-gearing connecting the two rollers at the forward end, as seen at *d;* or instead of belts, gear-wheels may be substituted.

The operation is as in common plowing. Where a field has many weeds these soon collect in front of the plow and so choke up its passage as to require frequent stoppage for cleaning them off; but with my improvement these are constantly stripped down from the colter by the revolution of the rollers. For this purpose they must turn toward each other, and so that the direction of the spikes shall be downward on the inner space, as shown by the arrows. By this means the weeds are crushed down and carried under the rollers and thrown outward, thus making a clear track for the colter and cutting-edge of the plow. It is only necessary that there be just opening enough for these to enter and that the weeds be kept from falling crosswise, for as soon as the weeds are past their points they are cast over with the furrows, and there is therefore no longer any danger from clogging. When plowing in long stable-manure the straw is by the action of the inside roller removed from the extreme edge of the slice, and thus as the furrow is turned over the straw will be perfectly covered in.

I am aware that a vibratory or rocking shaft armed with teeth and caused to act by the direct agency of the plowman has been heretofore employed to produce similar results; but the action of this is necessarily intermitted and uncertain, and it is therefore entirely unlike my invention, which acts constantly and independent of the hand of the attendant.

What I claim as of my invention, and desire to secure by Letters Patent, is—

Combining with a plow the revolving weed-clearing rollers armed with teeth or spikes, said rollers being operated automatically by a wheel attached to the back part of the plow, in the manner and for the purposes substantially as described herein.

JONATHAN HIBBS.

Witnesses:
S. H. MAYNARD,
JAMES L. ROBERTS.